UNITED STATES PATENT OFFICE.

JOHN LEONARD KELLOGG, OF BATTLE CREEK, MICHIGAN, ASSIGNOR TO KELLOGG TOASTED CORN FLAKE COMPANY, OF BATTLE CREEK, MICHIGAN, A CORPORATION OF MICHIGAN.

MANUFACTURE OF A FOOD PRODUCT.

1,189,128.      Specification of Letters Patent.     Patented June 27, 1916.

No Drawing.     Application filed November 19, 1915.   Serial No. 62,334.

*To all whom it may concern:*

Be it known that I, JOHN LEONARD KELLOGG, a citizen of the United States, residing in Battle Creek, county of Calhoun, and State of Michigan, have invented a new and useful Improvement in the Manufacture of a Food Product, of which the following is a specification.

My invention relates to the manufacture of a new food product from the soy or soja bean.

My invention comprises first the novel process hereafter described for making a powdered food, and the food thus made from the soy bean, which food is particularly adapted to be used as a diabetic food by mixing with water or milk.

My invention comprises also a novel process, hereafter described, for making a butter, and the butter thus made from the soy bean, to be used as peanut butter is now used, or mixed therewith.

In the present performance of my invention, I prefer to take the desired quantity of selected nice and plump soy beans and soak them in water for several hours until the skins are thoroughly softened. I then prefer thoroughly to dry the beans, by any usual or approved method, during which process the skins crack and become loosened from the beans. I then prefer to strip the skins from and clean the beans by putting the beans through an ordinary scouring device such as used for removing the shells from peanuts or taking the bran off wheat. I generally prefer to use the brush method, as this is less likely to injure or break the bean. The stripped beans are then roasted in an ordinary roaster preferably to a dark brown color, but not so as to caramelize or burn the beans. The roasted beans are then ground or otherwise reduced to a fine powder. This powder tastes and smells very much like peanut meal, but is quite dry.

In making my improved butter for spreading over crackers, bread, etc., as peanut butter is used, I mix the finely powdered product of the above process by preference with a good grade and sufficient quantity of peanut oil, but may also use olive oil, refined corn oil, or cotton seed oil, or other suitable material to give the product the texture and appearance of peanut butter.

The final product is used as peanut butter is used, and may be mixed with peanut butter in any desired proportions, as the two blend admirably and improve the flavor each of the other.

The soy beans contain much more protein than peanuts and my final product is, therefore, very desirable as a dietetic food.

The powdered product, before mixing with the oil, can also be used as a diabetic food, by mixing it with water or milk, and on account of its high protein value and low starch composition, it makes an admirable food for persons suffering from diabetes or for babies who require an excessive amount of protein.

I have set forth in detail above the method in which I now prefer to carry my invention into practice, but for a definition of the spirit and scope of the invention reference is to be had to the following claims.

I claim as my invention:

1. A process of making a food product from soy beans, which consists in first removing the skins from the soy beans, then roasting the beans to a dark brown color, and then reducing the stripped and roasted beans to a fine powder.

2. A process of making a butter from soy beans which consists in first removing the skins from the soy beans, then roasting the beans to a dark brown color, then reducing the roasted beans to a fine powder, and then mixing the powder with an edible vegetable oil to make a paste.

3. A process of making a food product from soy beans, which consists in cooking the soy beans in water until the skins are softened, then drying the beans and removing the skins, then roasting the beans to a dark brown color, and then reducing the beans to a fine powder.

JOHN LEONARD KELLOGG.